INVENTOR
GEORGE PANULINE
BY
ATTORNEY

July 22, 1958 G. PANULINE 2,844,242
INFEED CONVEYOR FLIGHT ADJUSTING MECHANISM
Filed Aug. 2, 1956 2 Sheets-Sheet 2
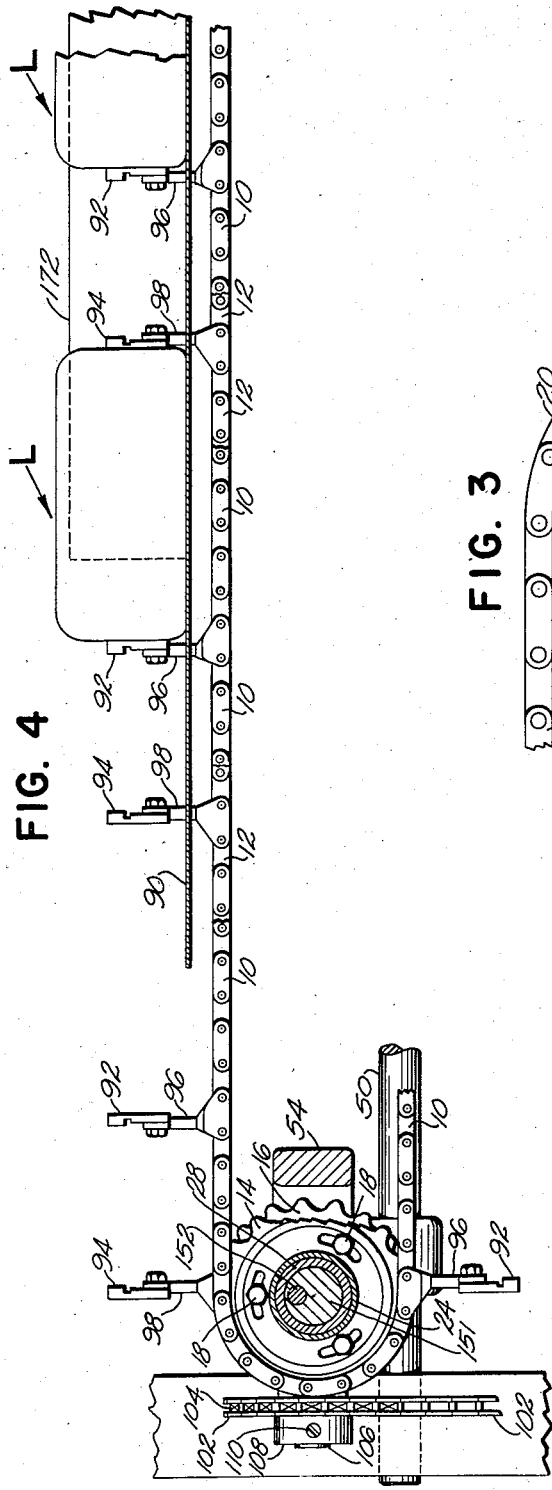
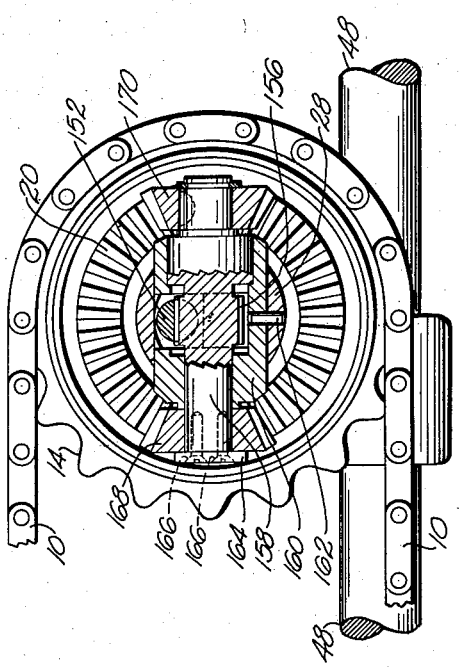
INVENTOR
GEORGE PANULINE
BY
ATTORNEY United States Patent Office 2,844,242
Patented July 22, 1958

2,844,242

INFEED CONVEYOR FLIGHT ADJUSTING MECHANISM

George Panuline, Fresh Meadows, N. Y., assignor to American Machine & Foundry Company, a corporation of New Jersey Application August 2, 1956, Serial No. 601,733

11 Claims. (Cl. 198—168)

This invention relates to wrapping machines, and more particularly to improvements in article feeding and conveying mechanisms and to means for automatically driving and adjusting such mechanisms to adapt them readily for handling articles of different lengths.

The invention, for example, finds use particularly in bread wrapping machines wherein successions of loaves of different lengths are wrapped, and it is necessary to adjust the infeed flights in order to adapt the flight spacing such that loaves of bread, sliced or unsliced, can be readily inserted therebetween and be conveyed properly into the wrapping machine. In accordance with the invention, means are provided which make it possible to vary the spacing between the sets of spaced conveyor flights when the machine is stopped or during the operation of the infeed conveyor, and either concurrently with or independently of the other adjusting mechanisms of the wrapping machine.

It is an object of the invention to provide an improved mechanism for adjusting the spacing of the flights of an infeed conveyor of a wrapping machine when the machine is stopped or during the operation of the machine or the movement of the conveyor of which the flights form a part either as a part of the operations of adjusting the several wrapper folding mechanisms of the machine or independently thereof.

It is a further object of the invention to provide a simplified mechanism for operating the infeed conveyor of a wrapping machine and also to provide simplified mechanisms for adjusting the sets of flights of the infeed conveyor to or from each other, the adjusting operations being effected either while the infeed is being driven or when it is stopped.

Another object of the invention is to provide an improved mechanism for driving and adjusting sets of flights which mechanism is characterized by a very smooth operation which is substantially free from impediments such as binding of components or other such types of malfunctioning which can impair the operation of the mechanism.

With these and other objects not specifically mentioned in view, the invention consists in certain constructions and combinations hereinafter fully described and then set forth in the claims hereunto appended.

In the accompanying drawings which illustrate an embodiment of the invention and form a part of this specification, and in which like reference characters designate the same or like parts:

Fig. 3 is a sectional side elevation taken on line 3—3 of Fig. 1; and

Fig. 4 is a partial side elevation taken on line 4—4 of Fig. 1, and showing a part of the infeed conveyor.

Figure 1:
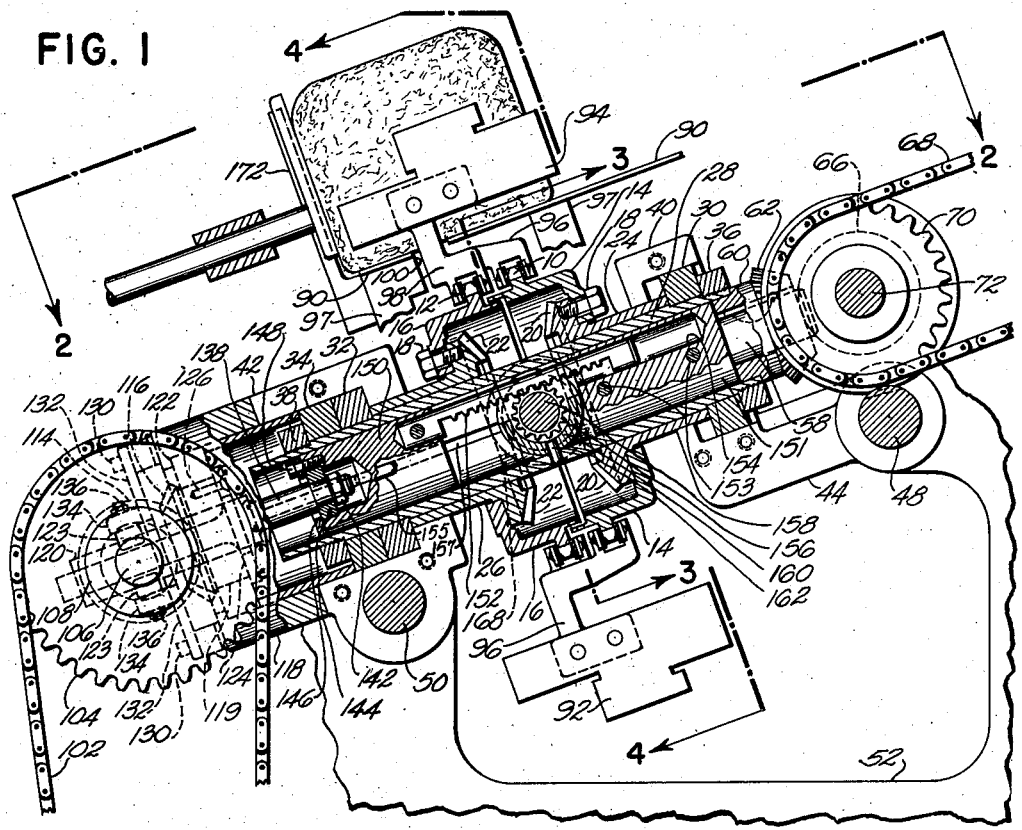
Fig. 1 is a sectional end elevation of a preferred form of the infeed conveyor flight drive and adjusting mechanism.
Figure 2:
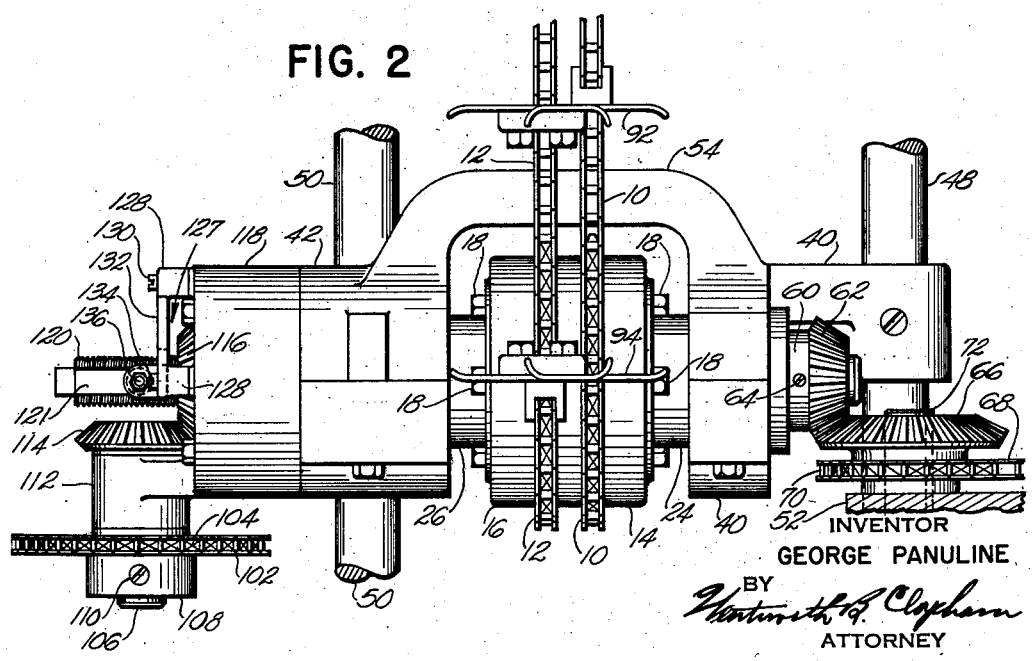
Fig. 2 is a plan view taken on line 2—2 of Fig. 1.

In accordance with the invention, there is provided a simplified mechanism for moving the chains which support the sets of spaced flights of the infeed conveyor. The chains are movable in opposite directions in order that the spacing between the flights can be adjusted to conform with the length of articles located therebetween and advanced thereby into a wrapping machine. The chains are supported on driving and driven sprockets. The driving sprockets are independently supported for relative rotary motion therebetween on a hollow drive shaft and by the hubs of bevel gears which are adapted to be driven in opposite directions by a bevel gear and pinion combination of which the pinion is located within the hollow shaft and rotates therewith.

For the driving of the sprockets, a gear mechanism is keyed or otherwise affixed to the shaft and the shaft, pinion, bevel gears and sprockets are driven without relative motion therebetween. However, a rack is provided within the shaft for engaging the pinion and controllably driving the bevel gears to adjust the relative positions of the sprockets on the shaft. This rack is axially movable within the hollow shaft and is mounted on a plunger which is guided for axial movement within the shaft and which receives its controlled axial movement by virtue of its connection to a threaded shaft in a threaded opening in a coaxial bevel gear, and in turn engaged by a controllable bevel gear. Thus, provision is not only made for driving spaced flights supported by chains driven by sprockets, but also for controlling the relative positions of the sprockets and thereby the flights. It will be noted in the description which follows that the apparatus provided is especially suited for smooth adjustment and driving operations which will be free from substantial interruption in performance by virtue of the freedom from binding of components or otherwise.

With reference to the drawings, which show a preferred embodiment of the invention, the article infeed conveyor consists of two parallel endless chains 10 and 12 running on suitable idler sprockets (not shown) and driven sprockets 14 and 16, respectively, which are driven from the main drive shaft of the machine as described below.

The sprockets 14 and 16 are affixed such as by screws 18 to bevel gears 20 and 22, respectively, whose collars or hubs 24 and 26 encircle hollow shaft 28. Bevel gears 20 and 22 are freely rotatably mounted on shaft 28 and, therefore, sprockets 14 and 16 are free to rotate on shaft 28.

Shaft 28 is supported at its ends by bearings 30, 32, and 34 which are maintained in position by locking members 36 and 38 threadably engaged on the ends of shaft 28. Bearing 30 is held by bracket 40 while the bearings 32 and 34 are supported by bracket 42, both of these brackets being respectively supported by arms 44 and 46 respectively on transverse rods 48 and 50 on the main frame 52 of the machine. Brackets 40 and 42 are connected through yoke 54.

Bearing 30 as previously noted, is retained at one end of shaft 28 by a collar 36 which is threadably engaged at the end of the shaft 28. From the shaft 28 extends an axle 58 which is integral with the shaft or otherwise affixed thereto. Axle 58 is engaged by hub 60 of a bevel gear 62 by known means of which the set screw 64 is an example.

Shaft 28 is driven by bevel gear 62 which is driven by bevel gear 66 which in turn is driven by chain 68 engaging the sprocket 70 on axle 72 which also supports the bevel gear 66. Chain 68 is driven by a suitable indexing driving means (not shown) forming a part of the wrapping machine and the driving of shaft 28 and its associated mechanism causes sprockets 14 and 16 to be driven as described hereinbelow and thereby articles to be transported into the wrapping machine.

Articles to be wrapped, such as sliced or unsliced loaves of bread, are fed by means of a chute (not shown) or any other suitable device (not shown) onto a conveyor runway 90 and into the pockets formed by spaced flights 92 and 94 attached to flight arms 96 and 98, respectively (Fig. 4). Arms 96 are secured to conveyor chain 10 at equidistantly spaced points therealong. Arms 98 are secured to conveyor chain 12 at equidistantly spaced points therealong. These arms are adapted to extend through a slot 100 in conveyor runway 90 which is supported by suitable brackets 97 mounted on the frame of the machine.

As heretofore indicated the invention contemplates the provision of novel means for enabling the adjusting of the spacing of flights 92 and 94 so that a wide range in length of article can be accommodated. Furthermore, this control is a continuous type operation which can be performed whether the flights are in motion or not. This adjustment is effected by means of varying the relative rotational positions of sprockets 14 and 16 on shaft 28 thereby adjusting chains 10 and 12 and accordingly the flights 92 and 94.

The adjustment can be made by manual means such as a handwheel (not shown) or automatic means driving chain 102 and thereby sprocket 104 mounted on an axle 106 by a hub 108 and a set screw 110. Axle 106 is supported in a bearing 112 and is rigidly engaged by a bevel gear 114. Bevel gear 114 turns in response to the actuation of chain 102 by the aforementioned control means.

Engaging bevel gear 114 is a further bevel gear 116 whose axis is normal to that of axle 106. Bevel gear 116 is mounted for rotation in the bell or cylinder 118 by means of the gear hub 119 retaining in bearing 122 by retaining cap 124 which is fastened to hub 119 by, for example, screws 126.

Bevel gear 116 is provided with a central threaded aperture which engages a screw 120 so that a rotary motion imported to bevel gear 116 causes a driving force to be established for screw 120. Screw 120 is provided with longitudinal grooves 121 which may be located 180° apart, as shown in Figure 1. These grooves accommodate rollers 123 functioning to prevent screw 120 from rotating so that it moves axially inwardly or outwardly relative to cylinder 118 in response to its drive. Rollers 123 are supported by spider 127 mounted by hubs 128 and screws 130 on the outer end of bell 118 and whose arms 132 support the flanges 134 and pivots 136 for the rollers. Screw 120 is provided with an extension 138 having an end portion of reduced diameter on which is rotatably supported a suitable bearing 144, one end of which is kept in position on extension 138 by nut 142. A cap 146 is rotatably mounted on extension 138 adjacent the other end of bearing 144 and is fixed to a plunger 150 by bolts 148. Plunger 150 is positioned in the base of shaft 28, as shown in Fig. 1, and is provided with a suitable key 155 which is received in an elongated keyway 157 of shaft 28. Since plunger is keyed to shaft 28, when the latter is rotated, plunger 150 and cap 146 will also be rotated. Likewise, when extension 138 is moved axially to the right or left, as viewed in Figure 1, plunger 150 and cap 146 will be moved similarly.

Referring to Figs. 1 and 3, a rack 152 is connected to plunger 150 at one end and is received at the other end in a guide bore 154 formed in a plug 151 pinned by pins 153 to shaft 28 so as to be capable of motion in either direction parallel to the axis of the shaft 28. Plug 151 is formed integrally with axle 58. Rack 152 engages a pinion 156 forming an integral part of an axle 158 journaled in bearing block 160 mounted transversely of and fixed in shaft 28 by pin 162. Thus plunger 150, cap 146, rack 152, axle 158, and plug 151 all rotate with shaft 28.

Bevel gear 170, meshing with bend gears 20 and 22, is keyed to one end of axle 158, as shown in Figure 3. To provide dynamic balance on axle 158, another bevel gear 168, meshing with bevel gears 20 and 22, is freely rotatably mounted on the other end of axle 158. Bevel gear 168 is held in operative position on axle 158 by a cap plate 164 and screws 166. It will be readily apparent that by means of the mechanism described above, whenever rack 152 is moved in shaft 28 inwardly or outwardly along the axis of shaft 28 by plunger 150, pinion 156 is driven, rotating axle 158 and causing bevel bear 170 to rotate bevel gears 20 and 22 in opposite directions. Since sprockets 14 and 16 are fixed to bevel gears 20 and 22 respectively, as described hereinabove, similar movement of these sprockets is effected, resulting in the desired adjustment of flights 92 and 94 so that they may accommodate the length of article L to be conveyed into the range of operation of infeed plunger 172 for delivery from between flights 92 and 94 into the wrapping machine of which the invention forms a part.

It will likewise be understood that when rack 152 is stationary in shaft 28, pinion 156, axle 158 and bevel gear 170 are likewise stationary relative to shaft 28. At that time, when shaft 28 is rotated, sprockets 14 and 16, fixed to bevel gears 20 and 22 which mesh with bevel gear 170, which, in turn, is fixed to axle 158, are also rotated with shaft 28 to effect the desired motion of the article infeed conveyor. Further, it will be evident that rack 152 and its associated mechanism can be actuated as shaft 28 is rotating, thus effecting the desired adjustments of flights 92 and 94 as an article L is being conveyed into the range of plunger 172 for delivery into the associated wrapping machine.

In operation, motion imparted to chain 68 will drive the sprocket 70 and thereby the bevel gear 66 which will in turn drive the bevel gear 62 and the shaft 28. The bevel gears 20 and 22 and the sprockets 14 and 16 will be therefore rotated and there will be no relative motion between the sprockets 14 and 16 if the condition of the rack 152 and thereby the pinion 156 and the bevel gear 168 is stationary.

When it is desired to adjust the spacing of flights 92 and 94, a movement is imparted to chain 102 to rotate the bevel gears 114 and 116 so as to drive screw 120 and move plunger 150 axially in either direction according to the movement given to chain 102 and the adjustment of the flights which is desired to increase or decrease the spacing between flights 92 and 94. The movement of plunger 150 actuates rack 152 and, therefore, pinion 156 so that bevel gear 170 is rotated and the sprockets 14 and 16 are rotated on the shaft 28 in opposite directions. Flights 92 and 94 so adjusted receive the articles to be transported and move these articles into the range of the plunger 172 which pushes the articles onto a lifter table (not shown) for introduction into the wrapping aperture of the wrapping machine. Plunger 172 may be similar in construction to that shown and described in McGinley Patent 2,650,459. Since plunger 172 and its operating mechanism forms no specific part of the invention further showing and description thereof are omitted.

What I claim is:

1. In an article conveyor having adjacent endless chains and article engaging flights mounted on each chain at equidistantly spaced points therealong, the flights on one chain being so spaced with respect to the flights on the other chain as to provide article receiving and conveying pockets, a hollow drive shaft, first and second bevel gears, hubs on said bevel gears loosely mounted on said shaft, first and second sprockets respectively mounted on the hubs of said bevel gears and engaging said chains, a pinion mounted in said hollow shaft coupled to said bevel gears and adapted upon rotation to rotate said bevel gears in opposite directions about said shaft, a rack extending axially in said shaft and engaging said pinion to determine the rotational position thereof, a third bevel gear coaxial with said shaft and provided with a central threaded aperture, a screw positioned in said threaded aperture, means to control the rotation of said third bevel gear to drive said screw, means to prevent rotation of said screw to limit the movement thereof to axial motion, and means to couple said screw to said rack whereby rotation of said third bevel gear adjusts the relative positions of said sprockets.

2. In an article conveyor having adjacent endless chains and article engaging flights mounted on each chain at equidistantly spaced points therealong, the flights on one chain being so spaced with respect to the flights on the other chain as to provide article receiving and conveying pockets, a hollow drive shaft, first and second bevel gears, first and second sprockets respectively mounted on said bevel gears and engaging said chains, a pinion mounted in said hollow shaft coupled to said bevel gears and adapted upon rotation to rotate said bevel gears in opposite directions about said shaft, a rack extending axially in said shaft and engaging said pinion to determine the rotational position thereof, a third bevel gear coaxial with said shaft and provided with a central threaded aperture, a screw positioned in said threaded aperture, means to control the rotation of said third bevel gear to drive said screw, means to prevent rotation of said screw to limit the movement thereof to axial motion, and means to couple said screw to said rack whereby rotation of said third bevel gear adjusts the relative positions of said sprockets.

3. In an article conveyor having adjacent endless chains and article engaging flights mounted on each chain at equidistantly spaced points therealong, the flights on one chain being so spaced with respect to the flights on the other chain as to provide article receiving and conveying pockets, a hollow drive shaft, first and second bevel gears, hubs on said bevel gears loosely mounted on said shaft, first and second sprockets respectively mounted on the hubs of said bevel gears and engaging said chains, a pinion mounted in said hollow shaft coupled to said bevel gears and adapted upon rotation to rotate said bevel gears in opposite directions about said shaft, a rack extending axially in said shaft and engaging said pinion to determine the rotational position thereof, and means for moving said rack to rotate said pinion to turn said bevel gears in opposite directions, whereby to adjust said flights to or from each other.

4. In an article conveyor having adjacent endless chains and article engaging flights mounted on each chain at equidistantly spaced points therealong, the flights on one chain being so spaced with respect to the flights on the other chain as to provide article receiving and conveying pockets, a hollow drive shaft, first and second bevel gears, hubs on said bevel gears loosely mounted on said shaft, first and second sprockets respectively mounted on the hubs of said bevel gears and engaging said chains, a pinion mounted in said hollow shaft transverse to the axis thereof, a gear coaxial with and driven by said pinion and positioned intermediate said first and second bevel gears for driving the same in opposite directions about said shaft, a rack extending axially in said shaft and engaging said pinion to determine the rotational position thereof, a third bevel gear coaxial with said shaft and provided with a central threaded aperture, a screw positioned in said threaded aperture, means to control the rotation of said third bevel gear to drive said screw, means to prevent rotation of said screw to limit the movement thereof to axial motion, and means to couple said screw to said rack whereby rotation of said third bevel gear adjusts the relative positions of said sprockets.

5. In an article conveyor as claimed in claim 2, a further gear intermediate said first and second bevel gears and mounted loosely and coaxially with said pinion to distribute the forces exerted on the first said intermediate gear.

6. In an article conveyor having adjacent endless chains and article engaging flights mounted on each chain at equidistantly spaced points therealong, the flights on one chain being so spaced with respect to the flights on the other chain as to provide article receiving and conveying pockets, a hollow drive shaft, first and second bevel gears, hubs on said bevel gears loosely mounted on said shaft, first and second sprockets respectively mounted on the hubs of said bevel gears and engaging said chains, a pinion mounted in said hollow shaft transverse to the axis thereof, a gear coaxial with and driven by said pinion and positioned intermediate said first and second bevel gears for driving the same in opposite directions about said shaft, a rack extending axially in said shaft and engaging said pinion to determine the rotational position thereof, a third bevel gear coaxial with said shaft at one end thereof and provided with a central threaded aperture, a screw positioned in said threaded aperture, means to control the rotation of said third bevel gear to drive said screw in the threaded aperture, said screw being provided with at least one longitudinal and peripheral groove, a roller having a fixed axis engaging in said groove for preventing rotation of said screw to limit the movement thereof to axial motion, means to couple said screw to said rack whereby rotation of said third bevel gear adjusts the relative positions of said sprockets, and gear means fixed to the other end of said shaft for driving said shaft and said positioned sprockets.

7. In an article conveyor having adjacent endless chains and article engaging flights mounted on each chain at equidistantly spaced points therealong, the flights on one chain being so spaced with respect to the flights on the other chain as to provide article receiving and conveying pockets, a hollow drive shaft, first and second bevel gears, hubs on said bevel gears loosely mounted on said shaft, first and second sprockets, respectively, mounted on the hubs of said bevel gears and engaging said chains, a pinion mounted in said hollow shaft and transverse to the axis thereof, a gear coaxial with and driven by said pinion and positioned intermediate said first and second bevel gears for driving the same in opposite directions about said shaft, a rack extending axially in said shaft and engaging said pinion to determine the rotational position thereof, a third bevel gear coaxial with said shaft at one end thereof and provided with a central threaded aperture, a screw positioned in said threaded aperture, means to control the rotation of said third bevel gear to drive said screw in the threaded aperture, said screw being provided with at least one longitudinal and peripheral groove, a roller having a fixed axis engaging in said groove for preventing rotation of said screw to limit the movement thereof to axial motion, a plunger in said hollow shaft and adapted for axial movement therein, rod means coupling said plunger to said screw, said rack being coupled at one end to said plunger, said shaft defining a bore for accommodating the other end of said rack, the rotation of said third bevel gear adjusting the relative positions of said sprockets, and gear means fixed to the other end of said shaft for driving said shaft and said positioned sprockets.

8. In an article conveyor having adjacent endless chains and article engaging flights mounted on each chain at equidistantly spaced points therealong, the flights on one chain being so spaced with respect to the flights on the other chain as to provide article receiving and conveying pockets, a hollow drive shaft, first and second bevel gears, hubs on said bevel gears loosely mounted on said shaft, first and second sprockets, respectively, mounted on the hubs of said bevel gears and engaging said chains, a bearing fixed in said hollow shaft, an axle supported by said bearing transverse to the axis of said shaft, a pinion on said axle, a gear coaxial with and driven by said pinion and positioned intermediate said first and second bevel gears for driving the same in opposite directions about said shaft, a further gear intermediate said first and second bevel gears and loosely mounted on said axle, a rack extending axially in said shaft and engaging said pinion to determine the rotational position thereof, a third bevel gear coaxial with said shaft at one end thereof and provided with a central threaded aperture, a screw positioned in said threaded aperture, a chain and sprocket means for controlling the spacing of the flights, a bevel gear coupling said chain and sprocket means to said third bevel gear for the rotation thereof, the rotation of said third bevel gear driving said screw in the threaded aperture, said screw being provided with at least one longitudinal and peripheral groove, a roller, a spider supporting said roller for engaging in said groove for preventing rotation of said screw to limit the movement thereof to axial motion, a plunger in said hollow shaft and adapted for axial movement therein, rod means coupling said plunger to said screw, said rack being coupled at one end to said plunger, said shaft defining a bore for accommodating the other end of said rack, the drive of said chain and sprocket means adjusting the relative positions of said sprockets, and gear means fixed to the other end of said shaft for driving said shaft and thereby said spaced flights.

9. In an article conveyor having adjacent endless chains and article engaging flights mounted on each chain at equidistantly spaced points therealong, the flights on one chain being so spaced with respect to the flights on the other chain as to provide article receiving and conveying pockets, a hollow drive shaft, first and second bevel gears, first and second sprockets, respectively, on said bevel gears and engaging said chains, a pinion mounted in said hollow shaft coupled to said bevel gears and adapted upon rotation to rotate said bevel gears in opposite directions about said shaft, a rack extending axially in said shaft and engaging said pinion to determine the rotational position thereof, a third bevel gear coaxial with said shaft and provided with a central threaded aperture, a screw positioned in said threaded aperture, means to control the rotation of said third bevel gear to drive said screw, means to prevent rotation of said screw to limit the movement thereof to axial motion, and means to couple said screw to said rack whereby rotation of said third bevel gear adjust the relative positions of said sprockets.

10. In an article conveyor having adjacent endless chains and article engaging flights mounted on each chain at equidistantly spaced points therealong, the flights on one chain being so spaced with respect to the flights on the other chain as to provide article receiving and conveying pockets, a hollow drive shaft, first and second bevel gears, hubs on said bevel gears loosely mounted on said shaft, first and second sprockets, respectively, on said bevel gears and engaging said chains, a pinion mounted in said hollow shaft coupled to said bevel gears and adapted upon rotation to rotate said bevel gears in opposite directions about said shaft, a rack extending axially in said shaft and engaging said pinion to determine the rotational position thereof, and means for moving said rack to rotate said pinion to turn said bevel gears in opposite directions, whereby to adjust said flights to or from each other.

11. In an article conveyor having adjacent endless chains and article engaging flights mounted on each chain at equidistantly spaced points therealong, the flights on one chain being so spaced with respect to the flights on the other chain as to provide article receiving and conveying pockets, a drive shaft, first and second bevel gears, hubs on said bevel gears loosely mounted on said shaft, first and second sprockets, respectively, on said bevel gears and engaging said chains, a pinion coupled to said bevel gears and adapted upon rotation to rotate said bevel gears in opposite directions about said shaft, a rack extending axially in said shaft and engaging said pinion to determine the rotational position thereof, and means for moving said rack to rotate said pinion to turn said bevel gears in opposite directions, whereby to adjust said flights to or from each other.

References Cited in the file of this patent

UNITED STATES PATENTS

| | | |
|---|---|---|
| 1,913,001 | Ross | June 6, 1933 |
| 2,736,421 | Bell | Feb. 28, 1956 |